Figure 1:
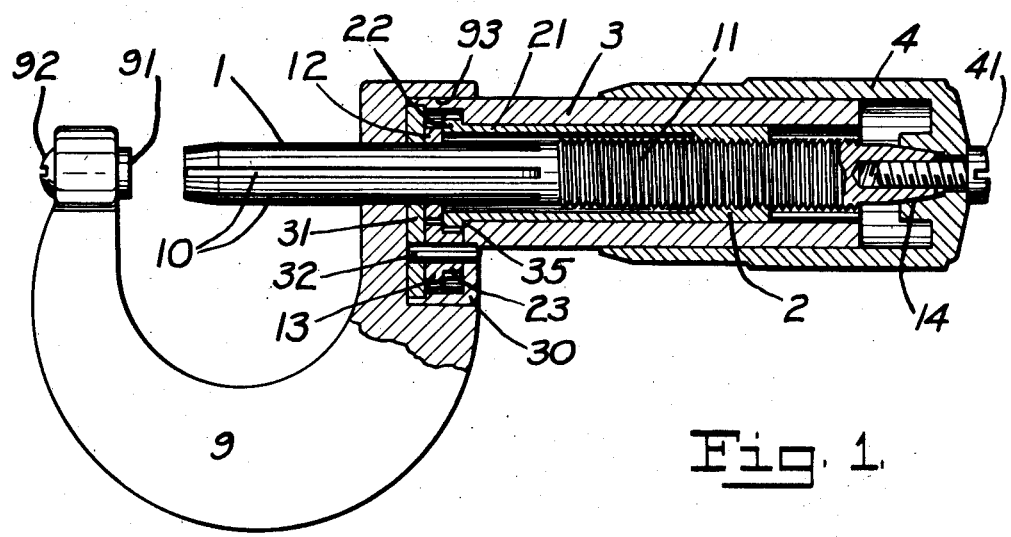

June 25, 1946.  C. T. ROTTLER  2,402,778

MICROMETER

Filed Jan. 15, 1945

Inventor
Clarence T. Rottler
By Reynolds Beach
Attorneys

Patented June 25, 1946

2,402,778

UNITED STATES PATENT OFFICE 2,402,778

MICROMETER

Clarence T. Rottler, Seattle, Wash.

Application January 15, 1945, Serial No. 572,858

12 Claims. (Cl. 33—164)

In normal micrometer gauges now in common use, the threads of the nut and spindle are ordinarily of a pitch of forty to the inch. One complete revolution of the thimble advances or retracts the spindle axially by one 40th part, or .025, of an inch. Since such gauges bear a major scale lengthwise of the barrel, cooperating with the end of the thimble as an index, and a minor scale circumferentially of the end of the thimble cooperating with an index running lengthwise of the barrel, the latter scale must be divided into twenty-five principal divisions for each revolution of the thimble, and in addition, such fractional markings as are practicable. As a matter of fact, because the thimble is not ordinarily of large diameter, and consequently of relatively small circumferential extent, there is not room for many graduations in the minor scale. It is therefore not easy, particularly for an inexperienced person, to read the scale graduations, and particularly so when the reading involves interpolations between two scale graduations. The result is that the accuracy of reading is not wholly dependable, even to ten thousandths of an inch, and in most cases can be depended upon only to the nearest thousandth of an inch.

In addition, it always is necessary for the user of such a micrometer to read the major scale along the barrel, and, where the index is intermediate two such gauge marks, to add arithmetically to the major reading the number of thousandths—for example 18—which is indicated by the minor scale. This is a source of error and confusion, particularly to inexperienced operators, of which there are many under current wartime conditions.

It is an object of the present invention to provide a micrometer which in all essential respects is similar in construction and mode of operation to those now in use, but which incorporates a minor scale, circumferentially of the thimble, which is graduated not in twenty-five principal divisions but in ten only, with such fractional divisions and markings as are practicable, intermediate the principal divisions. The result is, the addition now becomes the simple decimal addition of a number always less than ten, and similarly as to the fractional markings. Arithmetical additions of twenty-four or less are no longer required. This in itself will eliminate confusion and error in a large degree.

There is however, a further advantage which arises from so doing. Using a thimble no greater in circumferential extent than comparable thimbles heretofore used, since the minor graduations are now only ten in number, they are spaced two and a half times as far apart as were the twenty-five graduations in the micrometers now in use. The result is there can be actual intermediate graduations, with figures permitting them to be read directly; and in interpolating, the distances between graduations are spread out to an extent making for much greater ease in reading and interpolating. The final result is much improved accuracy of reading.

In accomplishing the object above, it becomes necessary to make certain mechanical changes in the structure and mode of operation of the micrometer, particularly to provide mechanism such that one complete revolution of the thimble effects not .025″ advance of the spindle, but .010″ advance. While this might be accomplished, theoretically at least, by employing a smaller pitch thread, actually this is not practicable for many reasons, or at least it is scarcely practicable to employ threads having the low pitch of one hundred to the inch, and any other pitch, with standard micrometer construction, would still involve the same type of difficulty in reading. It is therefore, a further object to provide a micrometer structure in which, using threads of the present standard of forty to the inch, or some comparable figure, the spindle is nevertheless advanced only .010″ for each complete revolution of the thimble.

It is also an object to provide a micrometer structure having the capabilities indicated above, and which lends itself to ready manufacture, subassembly, final assembly, and adjustment, all with the required accuracy, dependability, and ruggedness.

It is also an object to provide a micrometer structure which requires no bulky projecting parts, and in which all the mechanism is suitably encased, to guard it against injury and to retain proper lubrication, supplied at the factory.

It is likewise an object to provide a micrometer structure having the capabilities indicated above, and having all the provisions necessary or customary for adjustment for zeroing.

With these and similar objects in mind, and others as will appear as the description progresses, my invention comprises the micrometer structure shown in the accompanying drawing, described in this specification, and as will be more particularly defined by the claims which terminate this specification.

The accompanying drawing illustrates my micrometer in a present preferred form, it being understood, however, that various changes and modifications may be made, within the scope of the claims, as may be necessary, without departing the spirit and intent of my invention.

Figure 2:
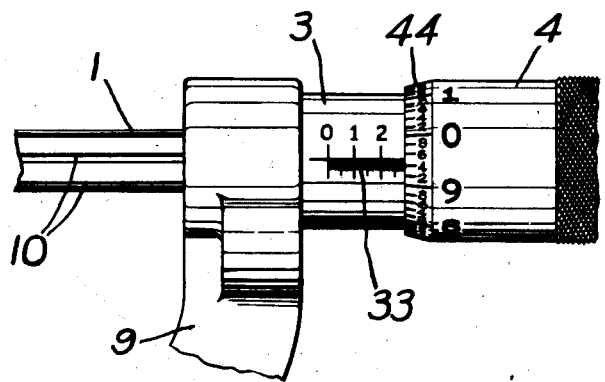

Figure 1 is a general axial section through the micrometer, and Figure 2 is an elevation of parts thereof, illustrating the scales.

The spindle 1 is mounted in one end of a bow or frame 9 for movement axially towards and from the anvil 91, which is held in place in the other end of the frame, and is adjustable axially by means of a screw 92 or similar means. The spindle 1 is also rotative, as will later appear. At its protruding end it is splined, as indicated at 10, and at its opposite end is provided with threads 11. Their pitch need not be forty to the inch, but for convenience of explanation it may be assumed that those illustrated are forty to the inch.

Threaded upon the threads 11 is a nut 2 which is rotatively journaled in a frame member, such as the barrel 3, which is in effect an extension of the frame 9, being formed at its lower end to be a press fit within a socket 93 in one end of the frame. The nut 2 need not itself be directly so journaled, but is shown as formed as part of a sleeve 21 which is rotative within the barrel 3, and is held, by means which will shortly be described, against axial movement relative to the frame or barrel.

To effect relative rotation of the nut 2 and the threads 11 of the spindle, a thimble 4 is provided. In this instance, it is the spindle 1 which is to be rotated by the thimble, and its coned end 14 is received within a similar axial socket within the end of the thimble 4, and is held therein by a screw 41. By this means relative angular adjustment may be had between the spindle and the thimble, for zeroing. It will be understood that instead of connecting the thimble to the spindle, the thimble might be connected to the nut 2, to effect its primary rotation. The gearing, later described, would be designed somewhat differently in that case, in order to produce the objectives of the invention.

If the nut 2 were nonrotative, or were held against rotation, and the spindle 1 were rotated, or vice-versa, the spindle would be advanced by each complete revolution of the thimble by the pitch distance of the threads 11, or .025". However, if the nut 2 rotates coincidentally with rotation of the spindle, in the same rotative sense but at a different (in this instance, slower) rotative speed, there is thus created differential rotation between the nut and spindle, and the actual advance of the spindle will be the resultant of this differential rotation. It follows that the actual rate of advance of the spindle, within practical limits, may be chosen at whatever value may be desired. If the threads 11 are of a pitch of .025", and it is desired to advance the spindle .010", it is necessary to provide differential gearing mechanism between the nut 2 or the sleeve 21, and the spindle 1, which produces a 2½ to 1 reduction in axial advance of the spindle.

While such differential gearing mechanism may take various forms, conveniently it consists of a spur gear 22 fixed upon the end of the sleeve, a spur gear 12 of different rotative characteristics splined upon the splines 10 of the spindle, and dual or twin gears 23 and 13 meshing respectively with the gears 22 and 12. Such gearing is mounted within the end of the barrel 3, or the extension 30 thereof, the whole being enclosed by a cap 31 pressed into a seat in the end of the barrel and its extension. The gears 13, 23 are journaled upon a pin 32 which is received in this cap and in the extension 30 respectively. The socket 93 in the frame 9 is shaped to receive the barrel end thus formed, so that the entire operating mechanism of the micrometer may be made up as a subassembly, and pressed into place in the frame.

The gear 22 constitutes a shoulder on the end of the sleeve 21, bearing on the shoulder 35 within the barrel, which takes the nut's reaction in one direction. Its reaction in the opposite direction is transmitted to the frame from the left face of the gear 22 to the gear 12, and thence to the cap 31. All such parts must be accurately fitted without lost motion whatsoever, but once so fitted and lubricated properly at the factory, there is no appreciable wear since the loads are negligible, and there is no cause to disturb the differential assembly.

It will be clear that the meaning of the statement, to the effect that the gears 12 and 22 are unlike in their rotative characteristics, is that they are of a different number of teeth, or of different diameters, or both, or are in some similar manner made unlike, so that, acting through the dual gears 13 and 23, they will effect a differential rotation of the nut 2 and spindle 1. By proper choice of the relative rotational characteristics of the gears 12 and 22, or by choice of the pitch of the threads 11, or both, various rotational relationships between the spindle 1 and the thimble 4 may be obtained. Instead of using gears, other equivalent means, as differential screw means, may be employed. The choice of characteristics to produce any desired relationship thus becomes merely a matter of design.

Still assuming that the threads 11 are of .025" pitch, and that the differential gearing is such as to effect a 2½ to 1 reduction in axial movement of the spindle, it may now be seen, with reference to Figure 2, that whereas the major scale 33 upon the barrel 3 is substantially unchanged over present practice, the minor scale 44 on the thimble 4 now has ten principal graduations, indicated by the larger figures at the right, but the spacing between them is sufficiently great that a considerable number of intermediate graduations may be made, as indicated by the smaller figures at the left of this scale. For instance, at the setting illustrated, the gauge reads approximately .28953". Even if the last figure were indefinite, it would still be possible to read very clearly the fourth figure and to be certain of its accuracy. Thus the reading to tens of thousandths may be considered accurate, and a reading into hundreds of thousandths is reasonably possible.

As has been indicated, for zeroing the anvil 91 may be adjusted axially and the thimble 4 may be adjusted rotationally, so that the micrometer may be exactly zeroed. While simple spur gears have been illustrated for convenience in drawing, these may be special gears, so formed as to avoid back lash. Since there is but slight stress on the parts in use, they will be found rugged and accurate over long periods of time, for little or no wear will occur. The sealed chamber enclosing the gear permits proper and substantially permanent lubrication to be provided at the factory. The micrometer departs but little in size, shape or weight from micrometers now in general use, but overall provides a micrometer having much greater accuracy and dependability of reading.

I claim as my invention:

1. A micrometer comprising a frame, a spindle movable axially therein, a rotatable thimble, means operatively connecting the thimble, spindle, and frame to effect axial movement of the spindle relative to the frame upon rotation of the thimble, such means including a screw and a nut, and means to effect simultaneous but differential rotation of the screw and nut, to advance the spindle at a rate different from the pitch of the screw threads.

2. A micrometer comprising a frame, a spindle movable axially therein, a rotatable thimble, a screw and nut, one of which is operatively connected to the thimble for rotation thereby, and the other of which is operatively connected to the spindle, to effect its axial movement, and back gearing mechanism interposed in one such operative connection, and reacting from the frame, to effect conjoint but differential rotation of the screw and nut, to advance the spindle at a rate different from the nominal rate determined by the pitch of the screw threads.

3. In a micrometer, in combination, a frame, a threaded spindle mounted therein for axial and rotative movement, a nut journaled in the frame and threaded upon said spindle, an actuator for effecting rotation of one of the spindle or nut, and differential back-gearing mechanism interconnecting the member thus rotated with its companion member, thereby to effect conjoint but differential rotation of the latter member.

4. In a micrometer, in combination, a frame, a nut mounted in the frame for rotation but held against relative axial movement, a spindle having threads threaded within the nut, and differential gear mechanism reacting from the frame and operatively interposed between the spindle and the nut, to effect conjoint but differential rotation of the two, and consequent axial advance of the spindle at a rate different from the nominal rate determined by the screw threads' pitch.

5. In a micrometer, in combination, a frame, a nut mounted in the frame for rotation but held against relative axial movement, a spindle having threads threaded within the nut, and differential gear mechanism reacting from the frame and operatively interposed between the spindle and the nut, to effect conjoint but differential rotation of the two, and consequent axial advance of the spindle at a rate different from the nominal rate determined by the screw threads' pitch, and an actuator to effect rotation of the spindle, said actuator and the frame carrying cooperating gauge marks indexed in accordance with the actual rate of axial movement of the spindle.

6. In a micrometer, in combination, a frame, a nut mounted in the frame for rotation but held against relative axial movement, a spindle having threads of selected pitch threaded within the nut, and differential gear mechanism reacting from the frame and operatively interposed between the spindle and the nut, arranged to effect conjoint but differential rotation of the two, and consequent axial advance of the spindle at an actual rate materially less than the nominal rate determined by the screw threads' pitch.

7. The combination of claim 6, including a thimble secured to the spindle, and characterized in that the differential gear mechanism is organized and arranged, relative to the selected pitch of the screw threads, to effect axial advance of the spindle and thimble at the rate of ten thousandths for each revolution of the spindle, and gauge means cooperating between the thimble and the frame, the thimble bearing a circumferential scale graduated in ten principal graduations, and fractions thereof.

8. The combination of claim 6, including a thimble secured to the spindle, and characterized in that the selected pitch of the screw threads will effect nominal advance of the nut at the rate of twenty-five thousandths for each revolution of the spindle, and further characterized in that the differential gear mechanism is organized and arranged, relative to such selected pitch of the screw threads, to effect axial advance of the spindle and thimble at the actual rate of ten thousandths for each revolution of the spindle, and gauge means cooperating between the thimble and the frame, the thimble bearing a circumferential scale graduated in ten principal graduations, and fractions thereof.

9. In a micrometer, in combination, a frame, a nut mounted in the frame for rotation but held against relative axial movement, a splined spindle having threads of selected pitch threaded within the nut, a first spur gear journaled in the frame for rotation with the nut, a second spur gear likewise journaled in the frame and splined upon the spindle for rotation therewith, and for relative axial movement of the spindle, the first and second spur gears being of unlike rotational characteristics, and a dual gear complemental to the first and second gears, journaled in the frame to effect conjoint but differential rotation of the spindle and nut, and consequent axial movement of the spindle at a rate different from the nominal rate determined by the screw threads' pitch.

10. A micrometer comprising a frame, a threaded spindle mounted therein for axial and rotative movement, a sleeve journaled in the frame, surrounding the spindle, and carrying a nut threaded upon the spindle's threads, an external thimble fixed to the spindle, and provided with gauge markings, a barrel fixed to the frame and carrying cooperating gauge markings, and differential gear mechanism reacting from the frame and operatively interposed between the sleeve and the spindle, to effect axial advance of spindle at a rate different from the nominal rate determined by the screw threads' pitch.

11. A micrometer comprising a frame, a barrel forming an extension of the frame, a spindle mounted within the frame for rotation and for movement axially within the barrel, said spindle being threaded within the barrel, a thimble secured to the spindle and surrounding the barrel, the thimble and the barrel carrying cooperating gauge markings, a sleeve carrying a nut journaled within the barrel for rotative movement but held against relative axial movement, the nut being threaded upon the threads of the spindle, and such threads being of a pitch selected to give a relatively rapid nominal rate of advance, and differential gear mechanism carried by the frame, interconnecting the sleeve with its nut, and the spindle, to effect axial movement of the spindle at an actual rate which is a fraction of the nominal rate determined by the screw threads' pitch.

12. A micrometer as in claim 11, characterized in that the differential gear mechanism is mounted upon the barrel, as a subassembly conjointly with the sleeve, spindle, and thimble, the whole being supported from the frame by the securement of the barrel upon the frame.

CLARENCE T. ROTTLER.